United States Patent
Park

(10) Patent No.: US 6,995,894 B2
(45) Date of Patent: Feb. 7, 2006

(54) MICROMIRROR IN CROSS-CONNECT SWITCH FOR OPTICAL COMMUNICATION SYSTEM AND METHOD FOR FABRICATING THE SAME

(75) Inventor: Jae Yeong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/321,676

(22) Filed: Dec. 18, 2002

(65) Prior Publication Data
US 2003/0123128 A1    Jul. 3, 2003

(30) Foreign Application Priority Data
Dec. 19, 2001    (KR) ...................... 10-2001-0081320

(51) Int. Cl.
*G02B 26/00*    (2006.01)
(52) U.S. Cl. ...................... 359/290; 359/223; 359/224
(58) Field of Classification Search ................ 359/290, 359/223, 224, 872, 280–282, 245, 247
See application file for complete search history.

(56) References Cited

U.S. PATENT DOCUMENTS

| | | | |
|---|---|---|---|
| 5,178,728 A * | 1/1993 | Boysel et al. ................. 216/13 |
| 6,201,629 B1 * | 3/2001 | McClelland et al. ........ 359/223 |
| 6,295,154 B1 * | 9/2001 | Laor et al. .................. 359/223 |

* cited by examiner

*Primary Examiner*—Hung Xuan Dang
*Assistant Examiner*—Joseph Martinez
(74) *Attorney, Agent, or Firm*—Fleshner & Kim, LLP

(57) ABSTRACT

Micromirror in a cross-connect switch for an optical communication system, and method for fabricating the same, the micromirror including a rotatable mirror rotatable in an X-axis direction for reflecting an incident light at a predetermined angle, rotatable beams around the rotatable mirror each connected to the rotatable mirror for rotating in a Y-axis direction together with the rotatable mirror, supporting posts around the rotatable beams each connected to the rotatable beam for supporting the rotatable beams, and a driving part on a bottom of the rotatable mirror for rotating the rotatable mirror and/or the rotatable beams as a voltage is provided thereto.

7 Claims, 12 Drawing Sheets magnetic flux

MICROMIRROR IN CROSS-CONNECT SWITCH FOR OPTICAL COMMUNICATION SYSTEM AND METHOD FOR FABRICATING THE SAME

This application claims the benefit of the Korean Application No. P2001-081320, filed on Dec. 19, 2001, which is hereby incorporated by reference.

BACKGROUND OF THE INVENTION

1. Field of the Invention

The present invention relates to a micromirror in a cross-connect switch for an optical communication system, and a method for fabricating the same.

2. Background of the Related Art

Currently, the computer and communication technologies have made rapid progress by means of optical fiber communication that facilitates real time transmission of massive information. Particularly, a communication network of copper wire comes to a limit following trends of fast transmission of multimedia information inclusive of data of a variety of forms, such as motion picture, speech signal, and character signal, and the like, bilateral interactive communication environment, an explosive increase of subscribers, and the like. Consequently, as an alternative, the optical communication network that permits a fast and undistorted transmission of a high carrier frequency comes to fore.

In general, a data interface of a related art communication network in which electric signals are used can be provided at a low cost by using integrated circuits of logic circuits, amplifiers, switches, and the like.

Opposite to this, since the data interface of the optical communication network which connects between a subscriber and relay, or a communication provider requires an optical connector module having, not the logic electronic integrated circuit, but optical switches, photodiodes, laserdiodes, and the like, the optical communication network costs high.

Currently, the data interface of the optical communication network costs high because the data interface of the optical communication network is provided with an optical transmitter having optical fiber which is a transmission line, an fiberoptic connector for connecting subscribers, optical switches, laser diodes, and the like, and fabricated relying on precision forming and assembly of components.

Particularly, since the optical switch, an essential component of the data interface of the optical communication network, carries out switching by moving an optical fiber on an input, or output side mechanically, the optical switch is large, has a low switching speed and an extremely limited switching capacity due to mechanical devices therein.

Moreover, though a bypass switch of light waveguide is suggested, the bypass switch has disadvantages in that drive and control systems are complicated since $n^2$ bypass switches are required for fabricating an n×n cross connect switch.

SUMMARY OF THE INVENTION

Accordingly, the present invention is directed to a micromirror in a cross-connect switch for an optical communication system, and a method for fabricating the same that substantially obviates one or more of the problems due to limitations and disadvantages of the related art.

An object of the present invention is to provide a micromirror in a cross-connect switch for an optical communication system, and a method for fabricating the same, which can fabricate a small sized, and light weighted optical switch module.

Another object of the present invention is to provide a micromirror in a cross-connect switch for an optical communication system, and a method for fabricating the same, which can fabricate a fast, low powered, and low cost optical switch module.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the micromirror in a cross-connect switch for an optical communication system including a rotatable mirror rotatable in an X-axis direction for reflecting an incident light at a predetermined angle, rotatable beams around the rotatable mirror each connected to the rotatable mirror for rotating in a Y-axis direction together with the rotatable mirror, supporting posts around the rotatable beams each connected to the rotatable beam for supporting the rotatable beams, and a driving part on a bottom of the rotatable mirror for rotating the rotatable mirror and/or the rotatable beams as a voltage is provided thereto.

The rotatable mirror includes a mirror for reflecting the incident light, and a mirror plate at a bottom of the mirror for backing up the mirror.

The rotatable beams are connected to both sides of the rotatable mirror with first hinges, and the supporting posts are connected to the rotatable beams with second hinges, wherein the first hinges are positioned in the Y-axis direction, and the second hinges are positioned in the X-axis direction.

The driving part includes magnetic films formed on bottoms of the rotatable mirror and the rotatable beams, magnetic coils formed opposite to respective magnetic films spaced a distance away therefrom.

The magnetic films on the rotatable mirror are formed on both sides thereof in the X-axis direction, and the magnetic films on the rotatable beams are formed on both sides thereof in the Y-axis direction.

In another aspect of the present invention, there is provided a micromirror in a cross-connect switch for an optical communication system including a substrate, a rotatable mirror over the substrate rotatable in an X-axis direction for reflecting an incident light at a predetermined angle, rotatable beams around the rotatable mirror each connected to the rotatable mirror for rotating in a Y-axis direction together with the rotatable mirror, magnetic films formed on the rotatable mirror and the rotatable beams respectively, magnetic coils formed on the substrate opposite to respective magnetic films for rotating the rotatable mirror and/or the rotatable beams depending on a voltage provided thereto, and supporting posts formed on the substrate around the rotatable beams each connected to the rotatable beam for supporting the rotatable beams.

The magnetic film may be at least one magnetic bar.

In further aspect of the present invention, there is provided a method for fabricating a micromirror in a cross-connect switch for an optical communication system, including the steps of providing a first substrate and a second substrate, fabricating an upper plate of the micromirror including the steps of forming magnetic films on the first substrate in predetermined regions thereof, etching a predetermined region of a back side of the first substrate, to form a rotatable mirror plate rotatable in an X-axis direction and rotatable beams connected to the mirror plate rotatable in a Y-axis direction, and forming a mirror on the rotatable mirror plate, fabricating a lower plate of the micromirror including the steps of forming magnetic coils on parts in predetermined regions of the second substrate, forming supporting posts over or under the second substrate, and assembling the upper plate and the lower plate of the micromirror such that the magnetic films on the first substrate and the magnetic coils on the second substrate are disposed opposite to each other.

The step of fabricating the upper plate of the micromirror includes the steps of forming an insulating film on a silicon substrate, forming magnetic films on the insulating film in predetermined regions thereof by using a shadow mask or photoresist, etching a back side of the silicon substrate in a predetermined region thereof until the insulating film is exposed, for forming a mirror, etching the exposed insulating film, for forming a rotatable mirror plate rotatable in an X-axis direction and rotatable beams connected to the rotatable mirror plate rotatable in Y-axis direction, and forming a mirror on the rotatable mirror plate.

The step of fabricating the upper plate of the micromirror includes the steps of providing an SOI (Silicon On Insulator) substrate which has an insulating film in a surface thereof, forming magnetic films on the substrate in predetermined regions thereof by using a shadow mask or photoresist, etching a back side of the SOI substrate in a predetermined region thereof for forming a rotatable mirror plate rotatable in the X-axis direction and rotatable beams connected to the rotatable mirror plate rotatable in Y-axis direction, and forming a mirror on the rotatable mirror plate.

The step of fabricating the lower plate of the micromirror includes the steps of forming magnetic coils on the silicon substrate in predetermined regions thereof, forming an insulating film on the magnetic coils, and forming supporting posts on the insulating film for supporting the rotatable beams.

The step of fabricating the lower plate of the micromirror includes the steps of forming magnetic coils on the silicon substrate in predetermined regions thereof, forming an insulating film on the magnetic coils, and etching a back side of the silicon substrate to form supporting posts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
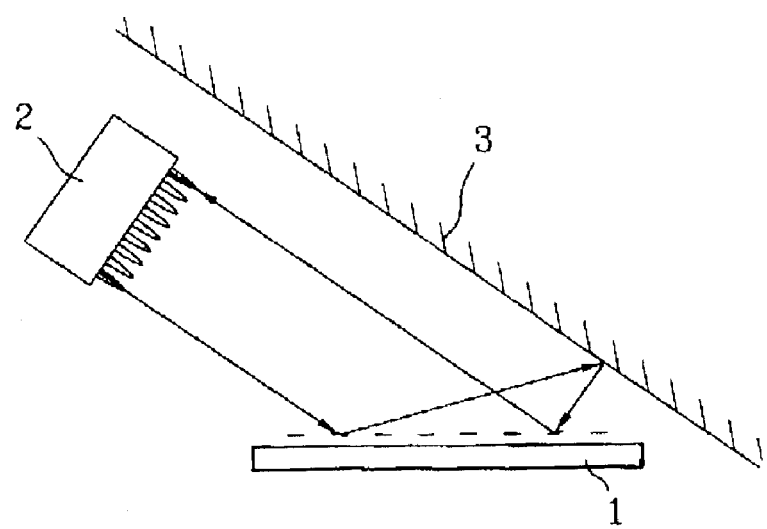
FIG. 1 illustrates an optical switch system of micromirror in accordance with a preferred embodiment of the present invention.

Reference will now be made in detail to the preferred embodiments of the present invention, examples of which are illustrated in the accompanying drawings. FIG. 1 illustrates an optical switch system of micromirror in accordance with a preferred embodiment of the present invention.

Referring to FIG. 1, the optical switch system of micromirror includes a two dimensional mirror array 1 each mirror rotatable independent from one another, input/output optical fiber bundles 2, and an a reflective plate 3.

The micromirror array 1 is rotatable in two dimensions for switching a plurality of input optical signals incident to input optical fibers to output optical fibers. The micromirror array 1 is a core component of a cross-connect switch which connects input optical fibers to output optical fibers in an optical communication system which employs an optical fiber bundle as a transmission line.

The optical system illustrated in FIG. 1 is operative as follows.

When a laser is directed from input optical fibers to the micromirror array, the laser is reflected at the micromirror to a direction fixed as the micromirror is rotated, reflected at the reflective plate 3, re-reflected at the micromirror, and directed to relevant output optical fibers. The input/output optical fiber bundles 2 are aligned at a predetermined angle to the micromirror array 1.

Figure 2:
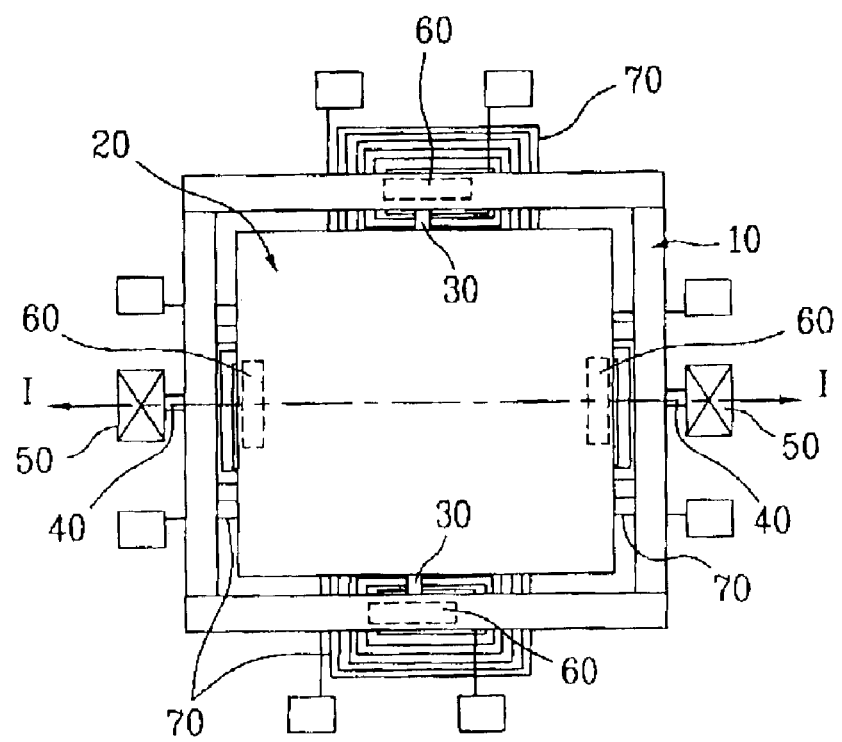
FIG. 2 illustrates a plan view of a micromirror in accordance with a preferred embodiment of the present invention.

FIG. 2 illustrates a plan view of a micromirror in accordance with a preferred embodiment of the present invention, and FIGS. 3~6 illustrate different embodiments each showing a section across a line I—I in FIG. 2.

Referring to FIGS. 2~6, the micromirror of the present invention is magnetically rotatable in two axes by an integrated driving coil, and a magnetic film at a bottom of the micromirror. There may be a variety of forms of the micromirror as shown in FIGS. 3~6.

Figure 3:
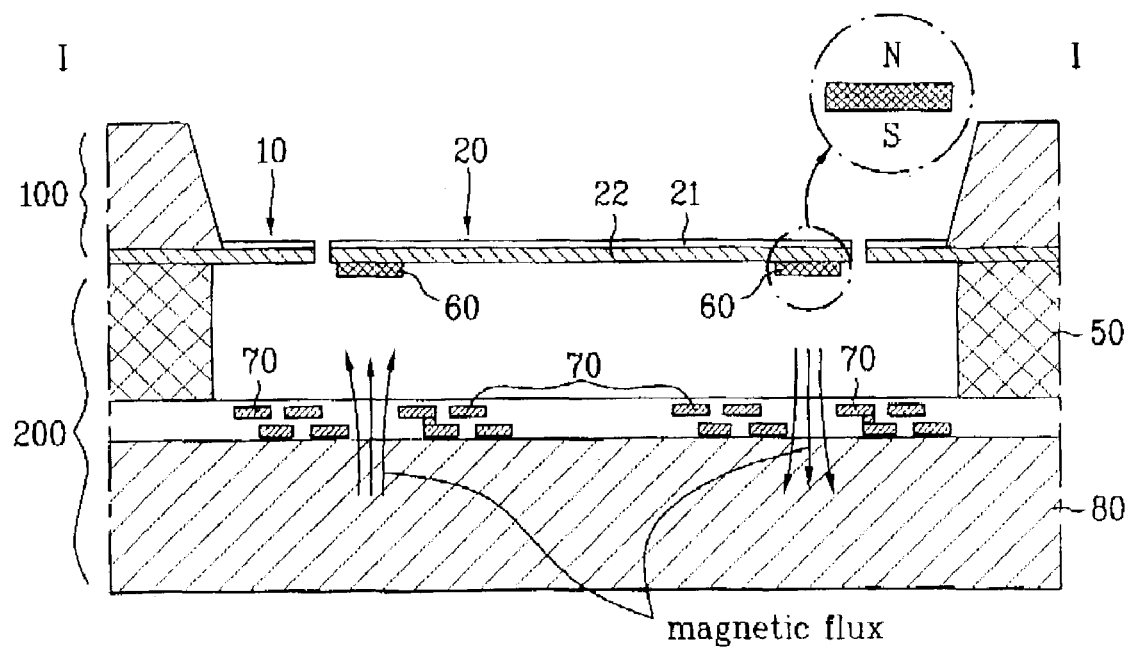
FIGS. 3~6 illustrate different embodiments each showing a section across a line I—I in FIG. 2.

Referring to FIGS. 2 and 3, the micromirror of the present invention includes an upper plate 100 having a rotatable mirror 20 and a magnetic film 60, and a lower plate 200 having a thin film coil 70.

The upper plate 100 includes a rotatable mirror 20, rotatable beams 10, first hinges 30 each connecting the rotatable mirror 20 and the rotatable beam 10, and a second hinges 40 each connecting the rotatable beam 10 and a supporting post 50 on the lower plate 200.

The rotatable mirror 20, fitted rotatable in an X-axis direction for reflecting the light at a predetermined angle, includes a mirror 21 for reflecting an incident light, a mirror plate 22 at a bottom of the mirror 21 for backing up the mirror 21.

The rotatable beams 10 positioned around the rotatable mirror 20 is connected to the rotatable mirror 20 with the first hinge 30, and fitted rotatable in a Y-axis direction together with the rotatable mirror 20. That is, the rotatable beams 10 are connected to both sides of the rotatable mirror 20 with the first hinges 30, and the supporting posts 50 are connected to both sides of rotatable beams 10 with the second hinges 40. The first hinges 30 are positioned in the Y-axis direction, and the second hinges 40 are positioned in the X-axis direction.

Figure 4:
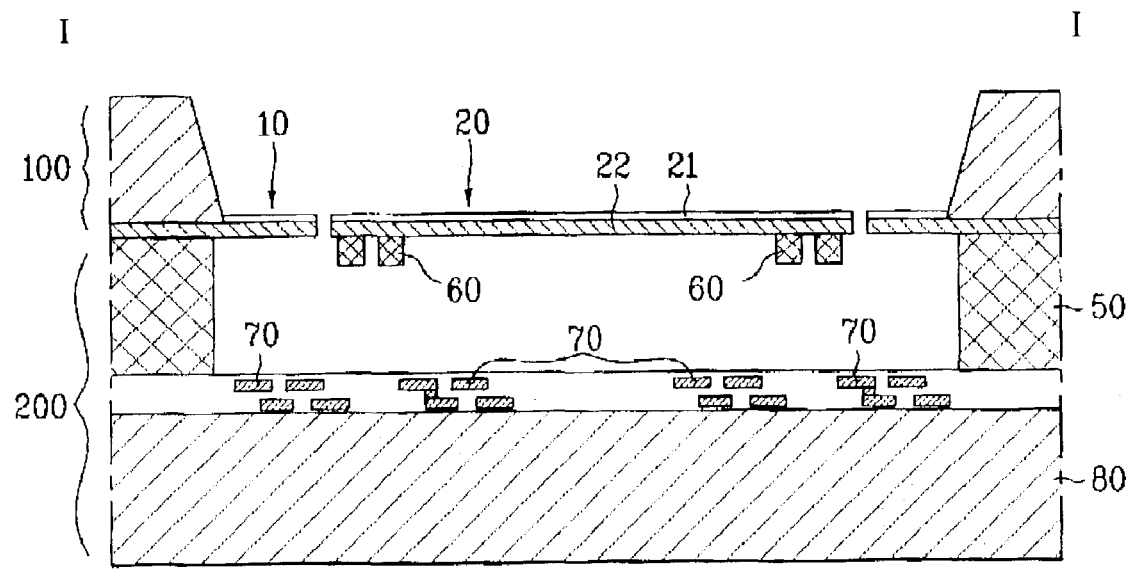

There are the magnetic films 60 formed at bottoms of the rotatable mirror 20 and the rotatable beams 10. The rotatable mirror 20 has the magnetic films 60 fitted at both sides thereof in the X-axis direction, and the rotatable beam 10 has the magnetic films 60 fitted at both sides thereof in the Y-axis direction. As shown in FIG. 4, the magnetic film 60 may be at least one magnetic bar, because the bar can reduce a stress and is to magnetize.

In the meantime, the lower plate 200 includes a substrate 80, magnetic coils 70 on the substrate 80, and supporting posts 50 for supporting the rotatable beams 10.

The magnetic coils 70 are formed on the substrate 80 opposite to the magnetic films 60 respectively, for rotating the rotatable mirror 20 and/or the rotatable beams 10 depending on a voltage applied thereto. The supporting posts 50 are formed on the substrate 80, and connected to the rotatable beams 10 with the second hinges 40, for supporting the rotatable beams 10.

The substrate 80 may be formed of silicon, glass, ceramic or the like, and the supporting posts 50 may be formed of epoxy, polymers, or the like. The supporting post 50, not only support the rotatable beams 10, but also adjust a height of the air gap between the magnetic film 60 at the bottom of the rotatable mirror 20 and the magnetic coil 70.

Figure 5:
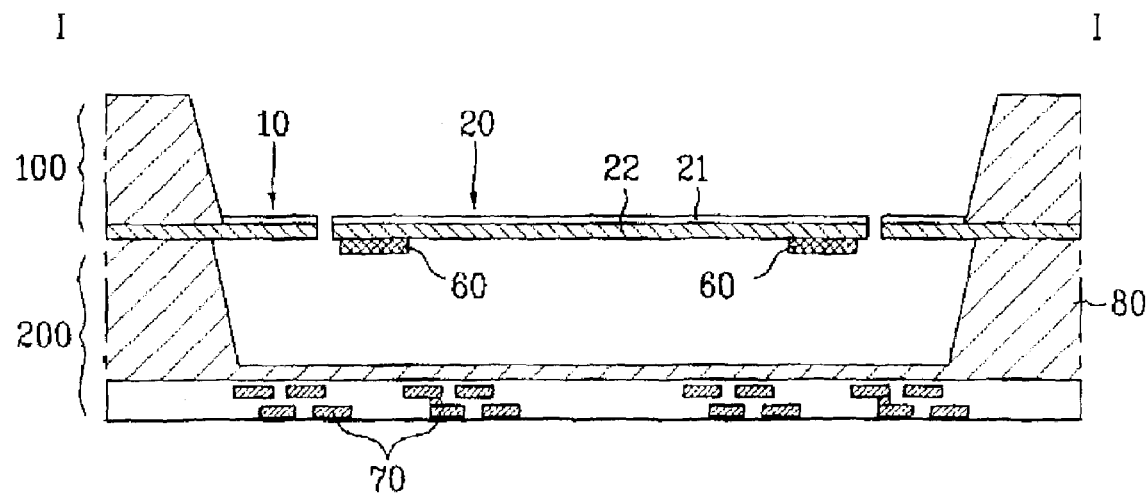
Figure 6:
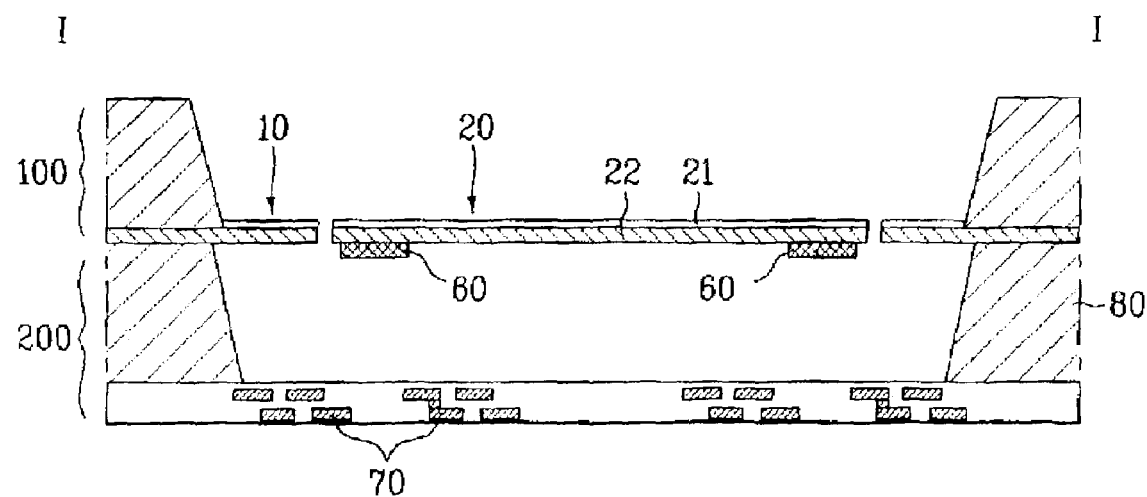
Figure 7A:
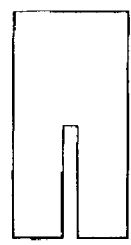
FIGS. 7A~7D illustrate hinges of a micromirror of the present invention.
Figure 7B:
Figure 7C:
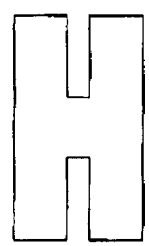
Figure 7D:
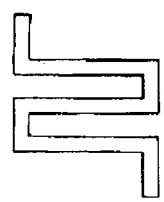

Different from FIGS. 3 and 4, FIGS. 5 and 6 illustrate structures in each of which no supporting posts 50 are used, but the substrate 80 itself substitutes the supporting posts. Though FIG. 5 illustrates a micromirror in which only a portion of the substrate 80 is etched so as not to expose a region the magnetic coils 70 are formed therein, FIG. 6 illustrates a micromirror in which the substrate 80 is etched fully so as to expose the region the magnetic coils 70 are formed therein fully.

The micromirror of the present invention is rotatable to a great tilting angle with a magnetic flux between the magnetic coils 70 and the magnetic films 60 formed even by a low voltage in a range of approx. 3~5 volts. That is, the micromirror of the present invention is designed to have a great tilting angle for switching many input/output optical signals.

The operation principle of the micromirror of the present invention will be explained.

When a magnetic force is generated by a current provided to the magnetic coils 70, the rotatable mirror 20 is rotated by an S pole and an N pole of the magnetic film 60 at the bottom of the rotatable mirror 20. That is, the rotatable mirror 20 having the magnetic films 60 formed thereon is pulled toward, or pushed away from the magnetic coils 70 to a tilting angle by an attractive force, or repulsive force generated depending on a direction of the magnetic force at the magnetic coils 70.

Referring to FIG. 3, when one of the pair of magnetic coils 70 is provided with a positive current and the other one is provided with a negative current to generate magnetic forces with different poles, the rotatable mirror has one side pushed, and the other side pulled, to rotate to a great tilting angle.

The present invention suggests to fabricate a magnetically driven micromirror array having a plurality of micromirrors arranged on a substrate by using a mask designed to arrange n×n micromirrors on a substrate and a single fabrication process.

Moreover, referring to FIGS. 7A~7D, the present invention suggests hinges having a variety of structures. The structures of hinges suggested in the present invention have reduced residual stresses, to facilitate driving of the rotatable mirror 20 even by a low magnetic force.

FIGS. 8A~8F illustrate sections showing the steps of a method for fabricating an upper plate of a micromirror in accordance with a preferred embodiment of the present invention.

Figure 8A:
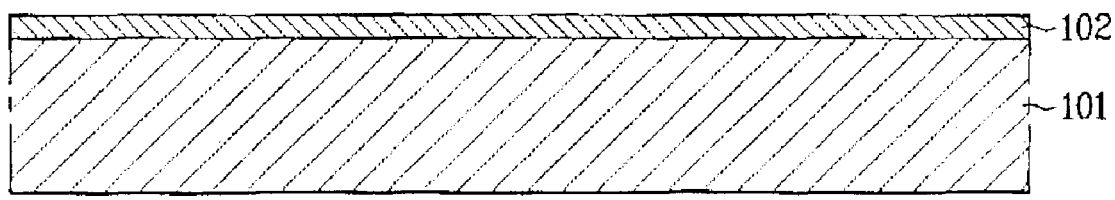
FIGS. 8A~8F illustrate sections showing the steps of a method for fabricating an upper plate of a micromirror in accordance with a preferred embodiment of the present invention.

Referring to FIG. 8A, an insulating film 102 is deposited on a substrate 101. The insulating film 102 may be an insulating film with a low stress, or an ONO (oxide/nitride/oxide) film, and the substrate 101 may be formed of silicon, glass, ceramic, or the like.

Figure 8B:
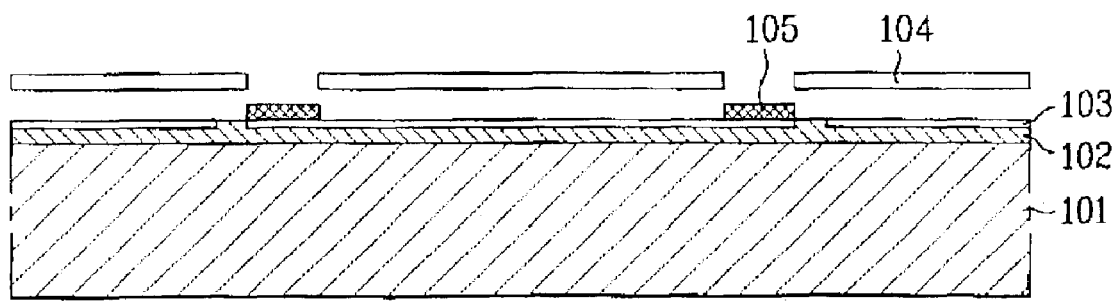

Then, referring to FIG. 8B, a metal pattern 103 is formed on the insulating film 102 for deposition of a magnetic film 105. The metal pattern 103 is used as adhesion layer in deposition of the magnetic film 105, as well as a mask in etching the insulating film 102. Then, a shadow mask 104 is aligned over the metal pattern 103, and the magnetic film 105 is deposited by RF magnetron sputter, or the like.

Figure 8C:
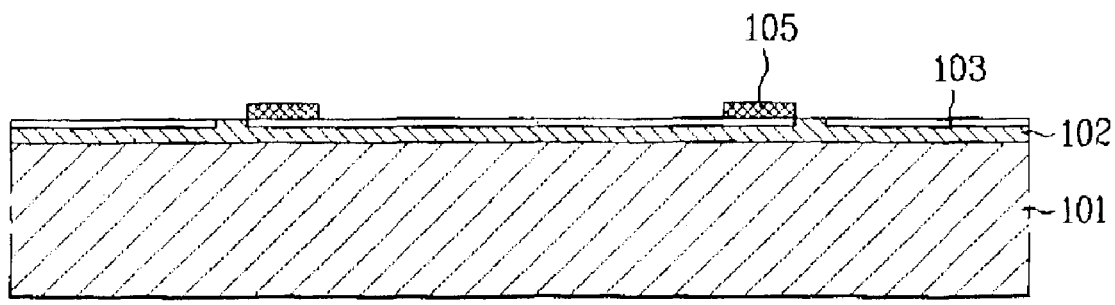

Then, referring to FIG. 8C, the shadow mask 104 is removed, and annealed at an elevated temperature for removing impurities from the magnetic film 105.

Figure 8D:
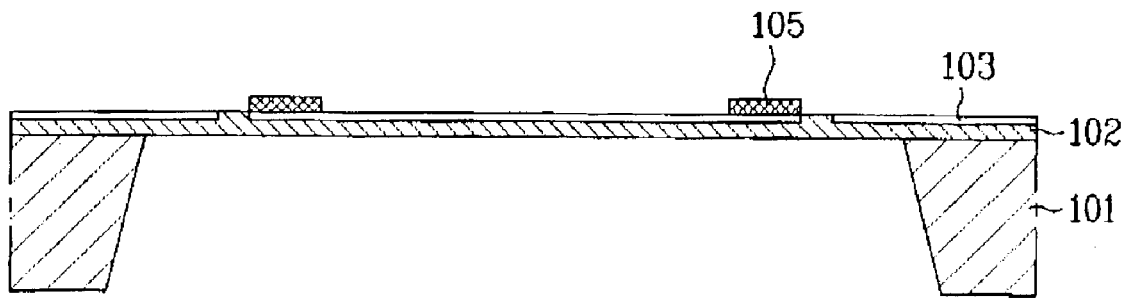

Next, referring to FIG. 8D, a bottom of the substrate 101 is back side etched by photolithography, until the insulating film 102 is exposed.

Figure 8E:
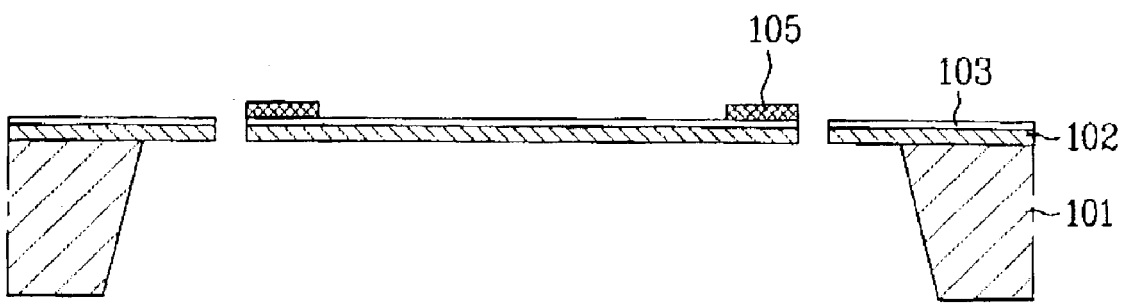

Then, referring to FIG. 8E, the insulating film 102 is removed partly, to form a mirror plate, rotatable beams, hinges, and the like of a rotatable mirror.

Figure 8F:
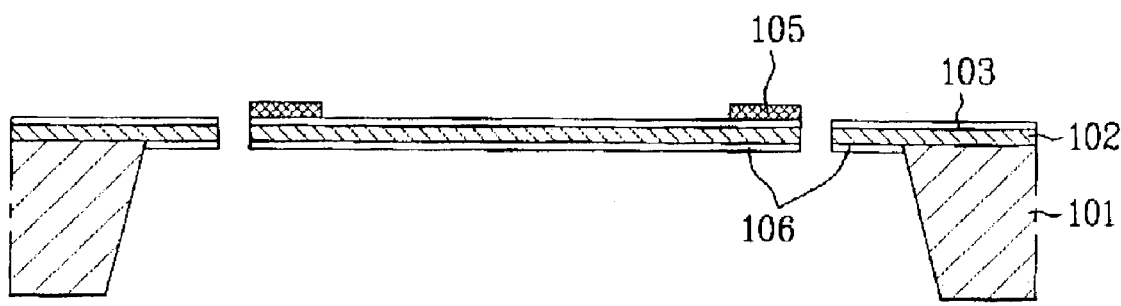

Referring to FIG. 8F, finally, Au, Al or the like having a high reflectivity is deposited on a bottom of the insulating film 103 having the magnetic film 105 formed thereon, to form a mirror surface 106, thereby finishing fabrication of the upper plate of the micromirror.

FIGS. 9A~9E illustrate sections showing the steps of a method for fabricating an upper plate of a micromirror in accordance with another preferred embodiment of the present invention. Though the embodiment shown in FIGS. 8A~8F deposits an insulating film 102 on a substrate 101 for using as a mirror plate of the rotatable mirror, the embodiment shown in FIGS. 9A~9B uses an SOI (silicon on insulator) substrate 110 as the mirror plate of the rotatable mirror.

Figure 9A:
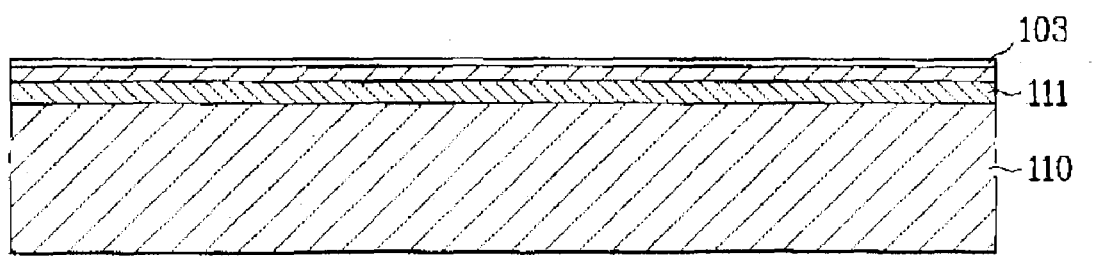
FIGS. 9A~9E illustrate sections showing the steps of a method for fabricating an upper plate of a micromirror in accordance with another preferred embodiment of the present invention.
Figure 9B:
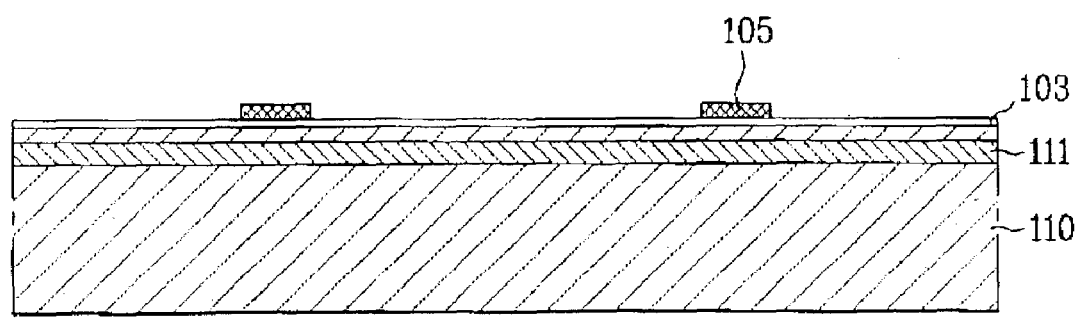

A metal pattern 103 is formed on an SOI substrate 110 as shown in FIG. 9A, a shadow mask 104 is aligned over the metal pattern 103, and a magnetic film 105 is deposited thereon by RF magnetron sputter, or the like.

Figure 9C:
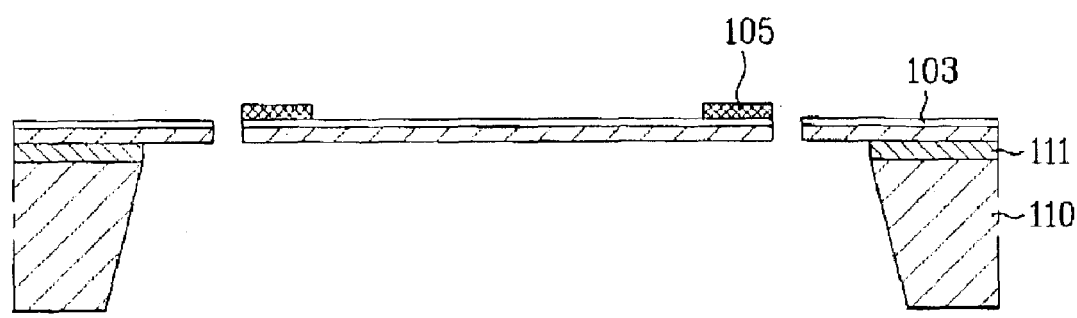

Then, referring to FIG. 9C, the shadow mask 104 is removed, and annealed at an elevated temperature, for removing impurities from the magnetic film 105, and a bottom of the substrate 110 is back side etched by photolithography, to expose an insulating film 111, and the exposed insulating film 111 is etched again, for exposing the SOI substrate 110. The SOI substrate 110 is removed partly, to form the mirror plate, the rotatable beams, the hinges, and the like of the rotatable mirror.

Figure 9D:
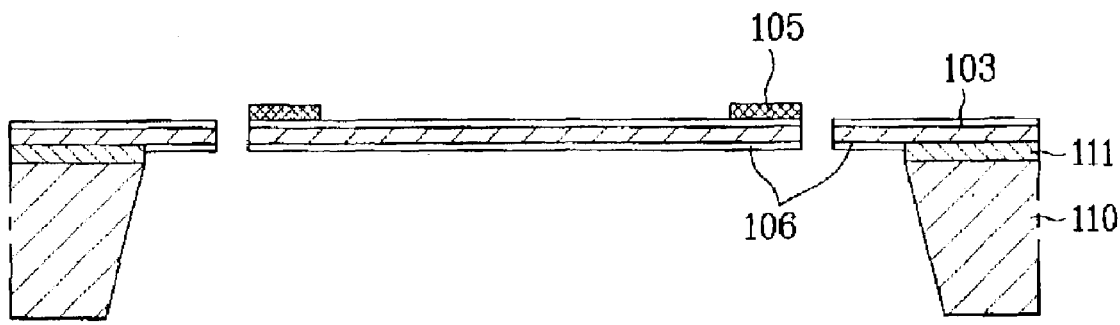
Figure 9E:
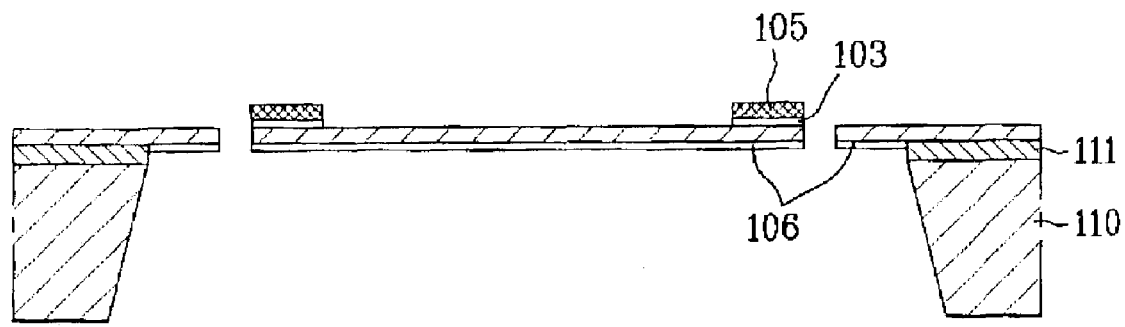

Then, after Au, Al or the like having a high reflectivity is deposited on a bottom of the SOI substrate 110 having the magnetic film 105 formed thereon, to form a mirror surface 106 as shown in FIG. 9D, the metal pattern 103 on the SOI substrate 110 is removed by using the magnetic film 105 as a mask, to finish fabrication of the upper plate of the micromirror.

FIGS. 10A~10F illustrate sections showing the steps of a method for fabricating an upper plate of a micromirror in accordance with another preferred embodiment of the present invention.

Figure 10A:
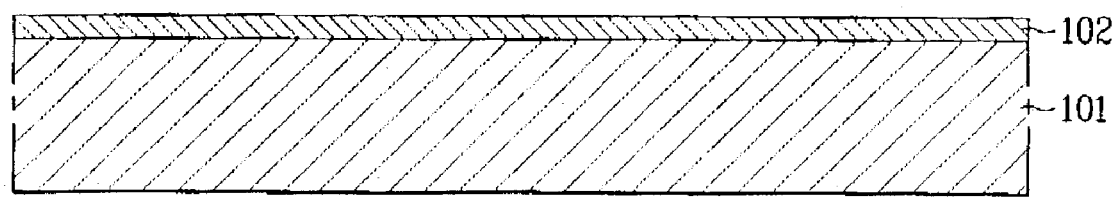
FIGS. 10A~10F illustrate sections showing the steps of a method for fabricating an upper plate of a micromirror in accordance with another preferred embodiment of the present invention.

Referring to FIG. 10A, an insulating film 102 is deposited on a substrate 101.

Figure 10B:
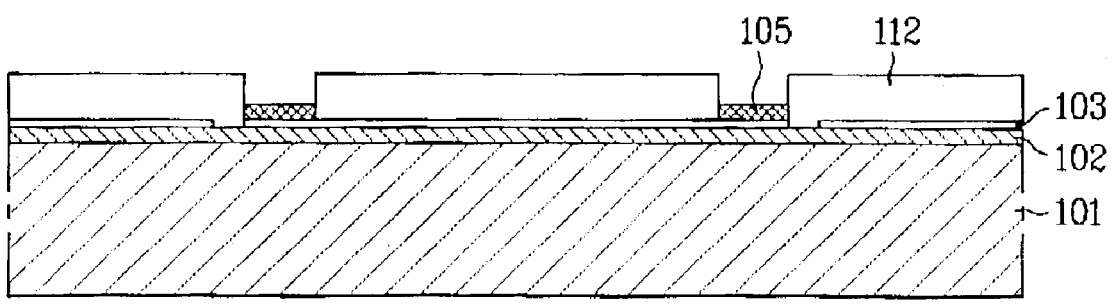

Then, referring to FIG. 10B, a metal pattern 103 is formed on the insulating film 102 for deposition of a magnetic film 105. A mold 112 of photoresist is formed on the metal pattern 103, and a magnetic film 105 is formed by electroplating. The magnetic film 105 may be hard magnets, or formed of a soft magnet alloy, such as NiFe alloy, NiCo alloy, and the like.

Figure 10C:
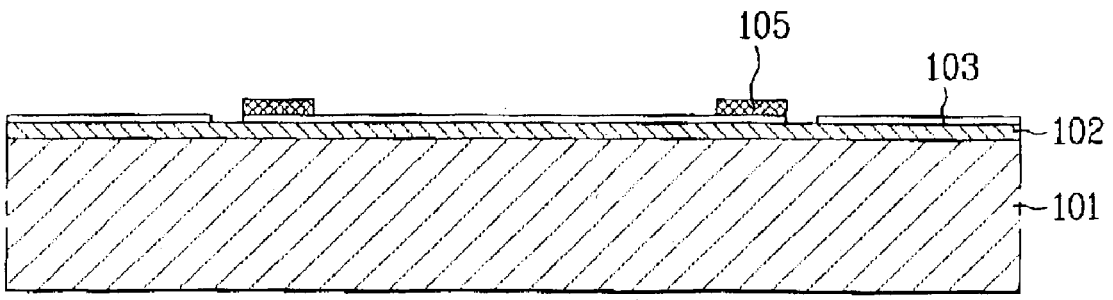

Then, referring to FIG. 10C, the mold 112 is removed, and annealed at an elevated temperature for removing impurities from the magnetic film 105.

Figure 10D:
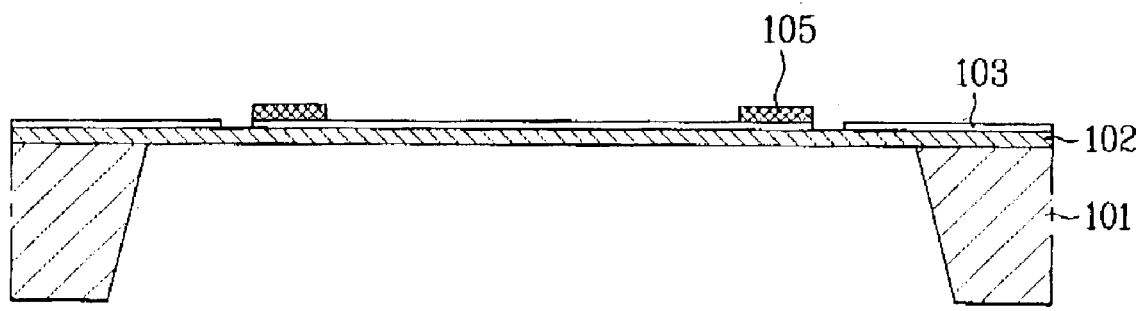

Next, referring to FIG. 10D, a bottom of the substrate 101 is back side etched by photolithography, to expose the insulating film 102.

Figure 10E:
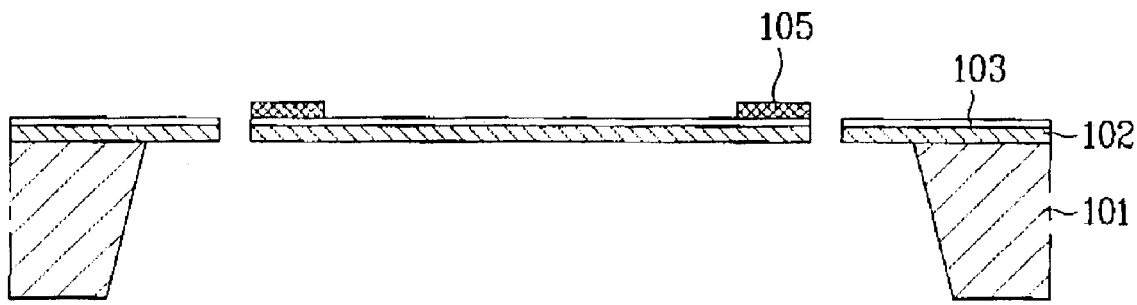

Referring to FIG. 10E, the insulating film is removed partly, to form the mirror plate, the rotatable beams, the hinges, and the like of the rotatable mirror.

Figure 10F:
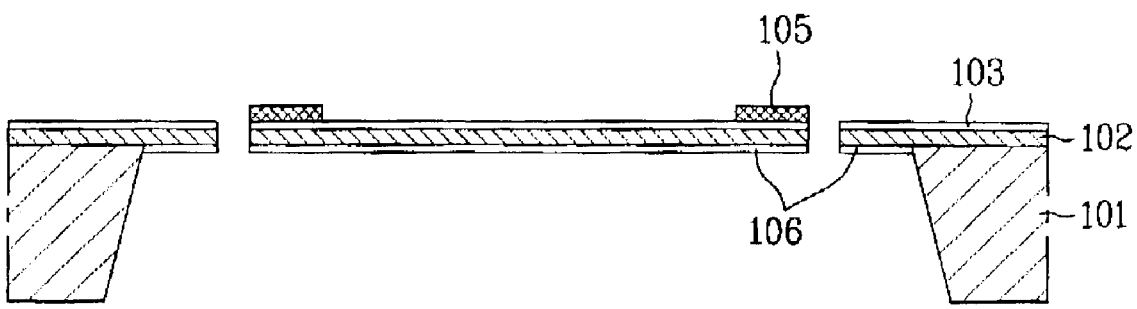

Then, referring to FIG. 10F, finally, Au, Al or the like having a high reflectivity is deposited on a bottom of the insulating film 103 having the magnetic film 105 formed thereon, to form a mirror surface 106, thereby finishing fabrication of the upper plate of the micromirror.

Figure 11A:
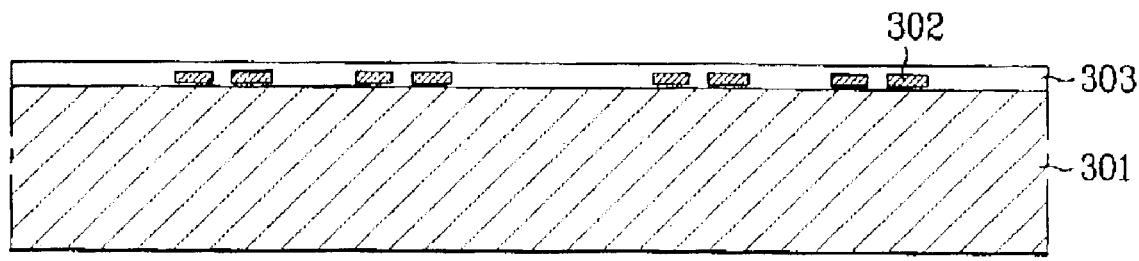
FIGS. 11A~11C illustrate sections showing the steps of a method for fabricating a lower plate of a micromirror in accordance with a preferred embodiment of the present invention.
Figure 11B:
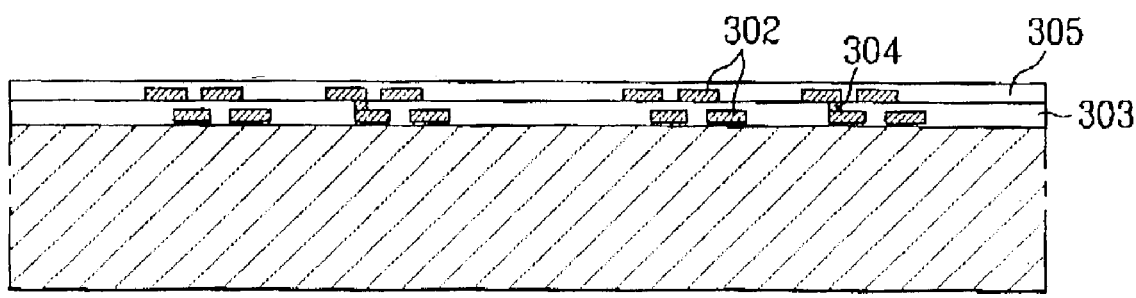
Figure 11C:
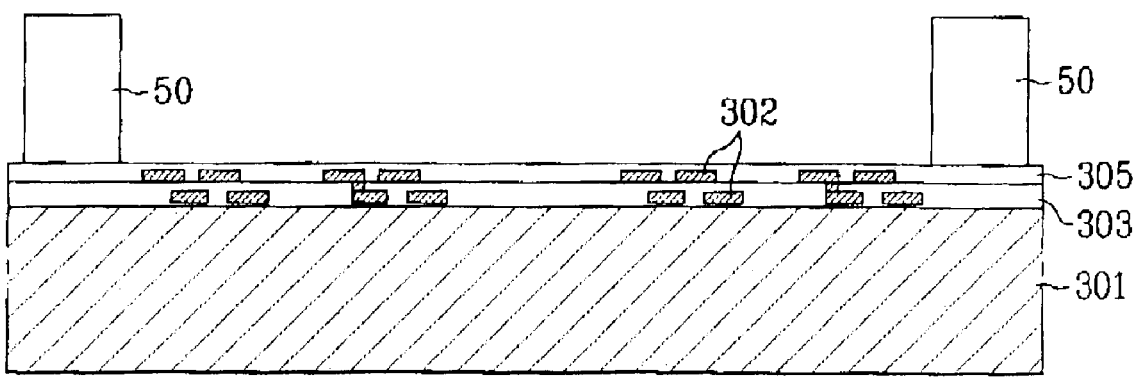

FIGS. 11A~11C illustrate sections showing the steps of a method for fabricating a lower plate of a micromirror in accordance with a preferred embodiment of the present invention.

Referring to FIG. 11A, spiral magnetic coils 302 are formed on a substrate 301 by sputtering, or electroplating, and a first protection film 303 is formed of polymer thereon.

Then, referring to FIG. 11B, a via 304 is formed by dry etching, more magnetic coils 302 are formed on the via 304 and the first protection film 303 by electroplating and sputtering. A second protection film 305 is formed of polymer on the magnetic coils 302.

Next, referring to FIG. 11C, supporting posts 50 are formed of Su-8 epoxy resin by UV photoetching, for controlling an air gap between the rotatable mirror on the upper plate and the magnetic coils 302. In place of the Su-8 epoxy resin, the supporting posts 50 may be formed of silicon, glass, metal, or the like.

By aligning the upper plate of the micromirror over the lower plate of the micromirror fabricated thus, the micromirror array operative by electromagnetic force can be fabricated with easy.

FIGS. 12A~12D illustrate sections showing the steps of a method for fabricating a lower plate of a micromirror in accordance with another preferred embodiment of the present invention.

Figure 12A:
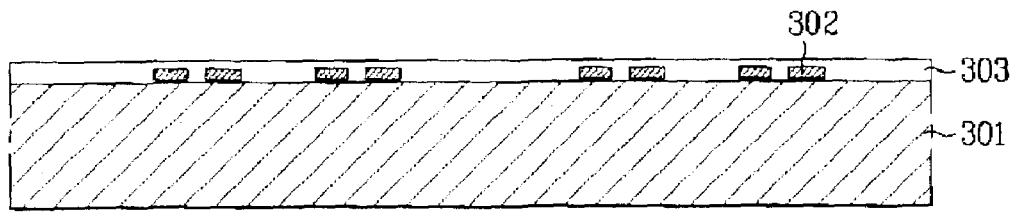
FIGS. 12A~12D illustrate sections showing the steps of a method for fabricating a lower plate of a micromirror in accordance with another preferred embodiment of the present invention.

Referring to FIG. 12A, spiral magnetic coils 302 are formed on a substrate 301 by sputtering or electro-plating, and a first protection film 303 is formed of polymer thereon.

Figure 12B:
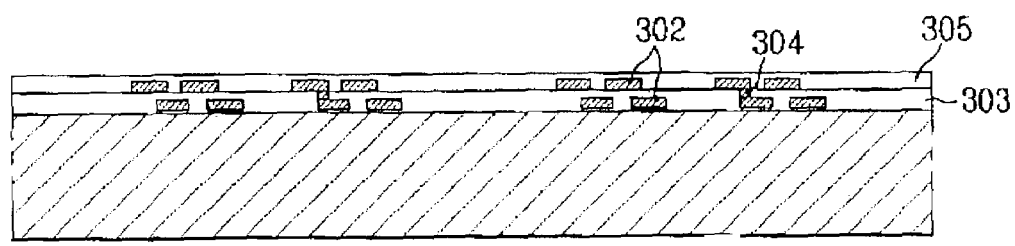

Then, referring to FIG. 12B, a via 304 is formed by dry etching, and more magnetic coils 302 are formed on the via 304 and the first protection film 303 by electro-plaint or sputtering. A second protection film 305 is formed of polymer on the magnetic coil 302.

Figure 12C:
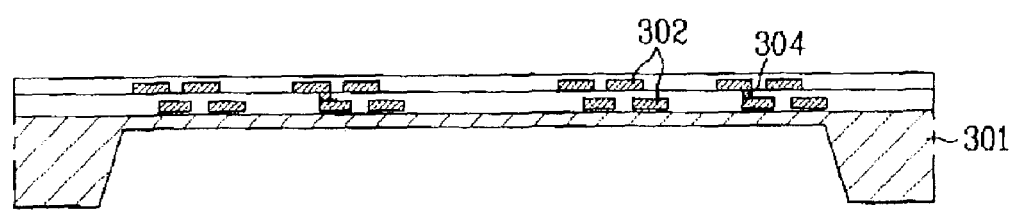
Figure 12D:
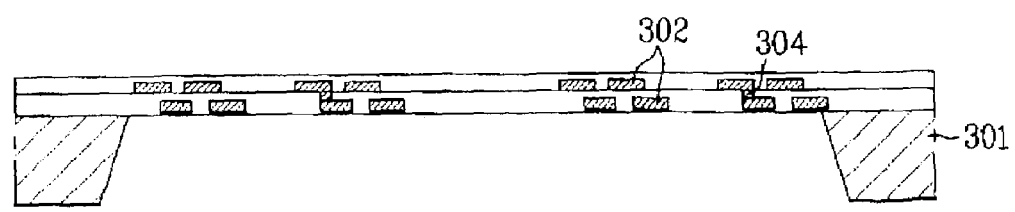

Next, referring to FIG. 12C, a back side of the substrate 301 is etched by photoetching, for using the substrate 301 as supporting posts. Though FIG. 12C illustrates a substrate 301 etched partly, not to expose a region the magnetic coils 302 are formed therein, FIG. 12D illustrates a substrate 301 etched fully, to expose a region the magnetic coils 302 are formed therein, fully.

By aligning the upper plate of the micromirror over the lower plate of the micromirror fabricated thus, a micromirror array driven by electromagnetic force can be fabricated with easy.

As has been explained, the micromirror in a cross-connect switch for an optical communication system, and method for fabricating the same of the present invention have the following advantages.

First, since the micromirror is operative magnetically, the micromirror has a great tilting angle and a high reliability.

The simple fabrication process provides a high yield, and a low production cost.

Third, when the micromirror of the present invention is applied to an optical switch, a component of a optical signal router module for an optical communication system, the optical switch can be made smaller and lighter, and at a low cost.

Fourth, since the optical switch can carry out the relay/distribution functions required for the optical communication, a large capacity fast information communication network can be realized.

It will be apparent to those skilled in the art that various modifications and variations can be made in the micromirror in a cross-connect switch for an optical communication system, and a method for fabricating the same of the present invention without departing from the spirit or scope of the invention. Thus, it is intended that the present invention cover the modifications and variations of this invention provided they come within the scope of the appended claims and their equivalents.

What is claimed is:

1. A micromirror, comprising:
   an upper plate, comprising,
      a rotatable mirror rotatable in an X-axis direction for reflecting an incident light at a predetermined angle,
      rotatable beams around the rotatable mirror each connected to the rotatable mirror for rotating in a Y-axis direction together with the rotatable mirror, and
      magnetic films formed on the rotatable mirror and the rotatable beams, respectively; and
   a lower plate, comprising,
      a substrate,
      magnetic coils formed on the substrate opposite to respective magnetic films for rotating the rotatable mirror or the rotatable beams, or both the rotatable mirror and the rotatable beams, depending on a voltage provided thereto, and
      supporting posts formed on the substrate;
      wherein the rotatable beams are directly attached to the supporting posts with hinges so as to enable rotation of the rotatable mirror and the rotatable beams together in the Y-axis direction, and wherein a height of the supporting posts determine a size of an air gap between the substrate and the upper plate.

2. A micromirror as claimed in claim 1, wherein the rotatable mirror includes;
   a mirror for reflecting the incident light, and
   a mirror plate at a bottom of the mirror for backing up the mirror.

3. A micromirror as claimed in claim 1, wherein the rotatable beams are connected to both sides of the rotatable mirror with first hinges, and the supporting posts are connected to the rotatable beams with second hinges, wherein the first hinges are positioned in the Y-axis direction, and the second hinges are positioned in the X-axis direction.

4. A micromirror as claimed in claim 1, wherein the supporting post is formed of epoxy, or polymers.

5. A micromirror as claimed in claim 1, wherein the magnetic films on the rotatable mirror are formed on both sides thereof in the X-axis direction, and the magnetic films on the rotatable beams are formed on both sides thereof in the Y-axis direction.

6. A micromirror as claimed in claim 1, wherein the magnetic film is at least one magnetic bar.

7. A micromirror, comprising:
   a substrate;
   magnetic coils formed on the substrate;
   at least two supporting posts formed on the substrate;
   rotatable beams directly attached to the supporting posts with hinges so as to enable rotation of the rotatable beams around a first axis;
   at least one magnetic film formed on the rotatable beams;
   a mirror attached to the rotatable beams so as to enable rotation of the mirror about a second axis; and
   at least one magnetic film formed on the mirror;
   wherein the mirror and the rotatable beams are configured to rotate together around the first axis, and wherein the mirror is configured to rotate around the second axis, in response to voltages applied to respective magnetic coils.

\* \* \* \* \*